(12) United States Patent
Simonyants et al.

(10) Patent No.: US 12,501,525 B2
(45) Date of Patent: Dec. 16, 2025

(54) MICROWAVE OVEN

(71) Applicant: QUMMY INC., San Francisco, CA (US)

(72) Inventors: Artem G. Simonyants, Krasnodar (RU); Evgeniy V. Pisarev, Krasnodar (RU); Aleksey A. Kislun, Krasnodar (RU); Artem V. Komissarov, Krasnodar (RU); Danil A. Filatov, Krasnodar (RU); Rinat R. Salikhov, Krasnodar (RU); Sergey A. Rodionov, Krasnodar (RU); Oleg A. Galitskiy, Krasnodar (RU)

(73) Assignee: QUMMY INC., San Francisco, CA (US)

( * ) Notice: Subject to any disclaimer, the term of this patent is extended or adjusted under 35 U.S.C. 154(b) by 742 days.

(21) Appl. No.: 17/961,194

(22) Filed: Oct. 6, 2022

(65) Prior Publication Data
US 2023/0115467 A1 Apr. 13, 2023

(30) Foreign Application Priority Data
Oct. 11, 2021 (RU) .................. 2021129550

(51) Int. Cl.
*H05B 6/64* (2006.01)
*H05B 6/68* (2006.01)

(52) U.S. Cl.
CPC ................. *H05B 6/6447* (2013.01)

(58) Field of Classification Search
CPC ............................ H05B 6/6441; H05B 6/6447
USPC ....... 219/702, 714, 704, 706, 753, 754, 756; 99/325
See application file for complete search history.

(56) References Cited

U.S. PATENT DOCUMENTS

| | | | | |
|---|---|---|---|---|
| 4,323,773 A * | 4/1982 | Carpenter | .......... | G06K 7/10881 D7/351 |
| 6,124,583 A * | 9/2000 | Bowers | ................ | H05B 6/6441 219/754 |
| 7,673,801 B2 * | 3/2010 | Park | ..................... | H05B 6/6441 219/679 |

* cited by examiner

*Primary Examiner* — Quang T Van
(74) *Attorney, Agent, or Firm* — FITCH EVEN TABIN & FLANNERY, LLP

(57) ABSTRACT

A microwave oven includes a cooking chamber, a working panel, a scanner that reads a bar or QR code from a food package, laser emitters located on the upper panel of the cooking chamber, input voltage control unit and controller. The scanner is placed inside the cooking chamber on its upper panel. The scanner, laser emitters and input voltage control unit are connected to the controller. When a package containing a food product is placed into the cooking chamber, the laser emitters match the target marks applied on the food package to provide a fixed position of a bar or QR code located on the food package and enable the scanner to read the bar or QR code on the food package, enabling the microwave oven to prepare the food product according to a cooking program determined for the food product and encoded into the bar or QR code.

4 Claims, 1 Drawing Sheet

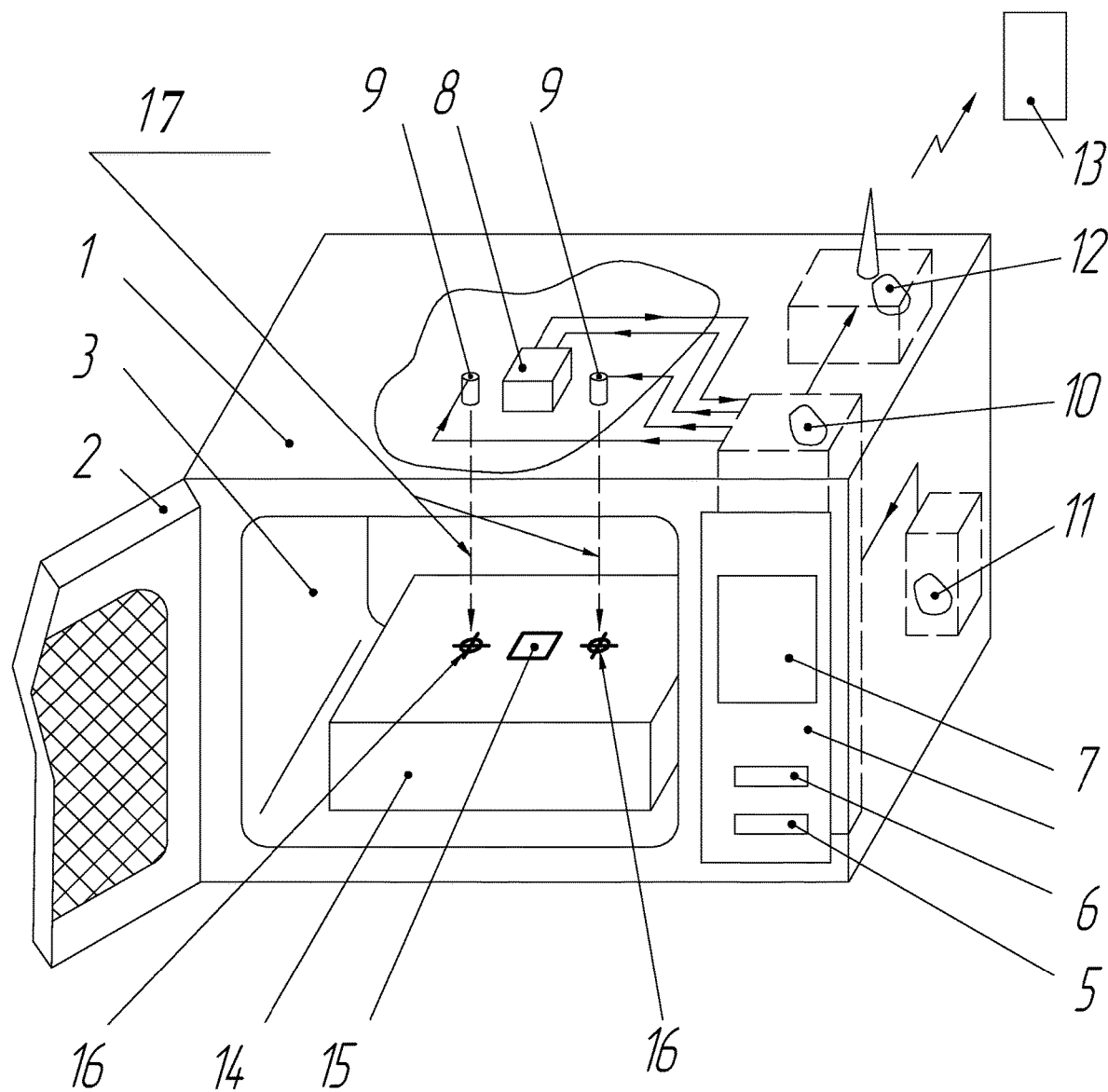

MICROWAVE OVEN

CROSS-REFERENCE TO RELATED APPLICATIONS

This Application Claims priority to Russian patent application no. 2021129550, filed Oct. 11, 2021.

TECHNICAL FIELD

This invention relates to a microwave oven intended for cooking using a bar or QR code, wherein data for food products and their cooking technology are obtained by reading a bar or QR code applied on a package containing a food product.

BACKGROUND

From the source U.S. Pat. No. 7,404,519 B2, G06K 15/00, 29.07.2008, a known microwave oven comprises a control panel, a scanner guide in the control panel, a scanner drawable into the scanner guide and pushable out of the scanner guide, and a driving section drawing the scanner into and pushing the scanner out of the scanner guide; the bar code scanner reads a bar code when in the scanner guide and when out of the scanner guide.

The disadvantage of this device is that it is difficult to control the microwave oven since the scanner has to be drawn out of the scanner guide for reading a bar code from the food product package, a restricted distance to which the scanner is drawn out of the guide, the need to return the scanner back into the guide after reading a bar code, and the need to practice skills to read a bar code using the scanner, otherwise the reading operation should be repeated several times.

An objective of the group of inventions described herein is to create a compact, safe aircraft during take-off/landing and flight with high maneuverability and controllability, as well as increased flight speed.

From the source RU 2316913 C2, H05B 6/64, 10.02.2008, known is a device for controlling a microwave oven using a bar code comprising a working panel placed on the face surface of the microwave oven, a scanner for reading a bar code installed in the work panel and intended for projecting light on the bar code attached to a food product package in order to obtain the data from the bar code, a main controller to control the food cooking operation in accordance with the data on the bar code obtained by the scanner reading the bar code, wherein the bar code scanner comprises at least two types of lamps having different angles of projection of light for reading the bar code.

The disadvantages of this device are the inconveniences caused because the cooking device requires using a special device on the housing of the microwave oven for the scanner to read the bar code, thereby resulting in the enlargement of the cooking device itself; the need to find any optimal space for accommodation of a package with a food product and for holding it for some time relative to the scanner for making the scanner beam accurately hit the bar code applied on the food product package and for reading any information from the bar code; and the need to practice the skills to read a bar code using the scanner, otherwise the reading operation should be repeated several times.

SUMMARY

The technical result achieved by the present invention is controlling the microwave oven for preparing a food product to a higher quality with encrypted information on identification of a food product automatically read in the form of a bar or QR code applied on a package containing a food product, using a scanner located inside the cooking chamber.

This technical result is achieved in that the microwave oven comprises a chamber for cooking food products, a working panel placed on the face surface of the microwave oven, a scanner configured to read a bar or QR code from a package containing a food product; and a controller to control the food cooking operation in accordance with the data of a bar or QR code applied on the food product package; wherein the scanner used for reading is placed inside the cooking chamber on its upper panel, and the microwave oven further includes laser emitters located on the upper panel inside the cooking chamber, and an input voltage control unit, such that when placing a package with a food product into the cooking chamber, the laser emitters should match the target marks applied on the package to provide a fixed position of a bar or QR code applied on the food product package for its reading by the scanner; wherein the scanner, the laser emitters and the input voltage control unit are connected to the controller to control the food cooking operation.

The method of arrangement of the scanner and lasers inside the cooking chamber on its upper panel provides a fixed position for the food product package inside the cooking chamber, automatic reading of a bar or QR code by the scanner from a food product package inside the cooking chamber; and provides an optimal space for accommodation of the package for cooking inside the cooking chamber, thus making it possible to control the microwave oven for preparing a food product to a higher quality through the application encrypted in a scanner-read bar or QR code.

Additionally, no matter what code (i.e., a bar or QR code) is applied on a food package, the same scanner installed inside the cooking chamber on its upper panel is used for reading said code.

Additionally, usage of an input voltage control unit makes it possible for the controller of the microwave oven to monitor the supply line input voltage in order to adjust programmed time frames with reference to food cooking phases, thus providing operation of the microwave oven for preparing a food product to a higher quality through the application encrypted in a scanner-read bar or QR code.

Additionally, the data transfer unit coming with the microwave oven transmits data about the cooked food products in order to keep automatic records of certain food products available and usable inside catering refrigerators after a cooking cycle is finalized, to transmit the information about consumption of a food product to the server, and provides for operating the microwave oven throughout the control of food cooking capacity.

BRIEF DESCRIPTION OF THE DRAWINGS

The present invention is described with reference to the drawings.

FIG. 1 illustrates a perspective view of a microwave oven intended for cooking.

DETAILED DESCRIPTION

The microwave oven 1 of FIG. 1 comprises a housing on which a door 2 is installed, a cooking chamber 3 is provided inside the housing, a lighting device in the cooking chamber 3 (not shown in FIG. 1), and a working panel 4. There is an on-off button 5, a mode selection button 6, and a mode display screen 7 on the working panel. Moreover, on-off operations and choice of modes of the microwave oven 1 may be performed using other technologies, for example, touch-sensitive control.

A scanner 8 and laser emitters 9 are located inside the cooking chamber 3 in the middle of its upper panel. The scanner 8 is configured to read a bar or QR code 15, which is applied on a package 14 containing a food product, and which carries encrypted information that permits, during the insertion of the food product package into the cooking chamber 3, the identification of the food product and of the programmed time frames with reference to the food cooking phases.

The laser emitters 9 are installed so that they keep right-left symmetry relative to the scanner 8. During insertion of the package 14 with a food product into the cooking chamber 3, the laser emitters 9 match the target marks 16 applied on the food package 14 to provide the fixed position of the food package 14 within the cooking chamber 3, to enable the scanner 8 to read a bar or QR code 15 from the food package 14 and to provide an optimal space for accommodation of the food package 14 for cooking within the cooking chamber 3.

The scanner 8 and laser emitters 9 are connected to the controller 10, which controls the functions of the microwave oven 1.

A bar or QR code 15, which carries encrypted information for identifying a food product and programmed time frames with reference to food cooking phases, is applied in the middle of the upper front face of the food package 14, relative to which two target marks 16 are applied symmetrically (left-right symmetry) with the distance between them matching the distance between the laser emitters 9.

Additionally, it should be noted that no matter what code (i.e., a bar or QR code) is applied on a food package 14, the same scanner 8 installed inside the cooking chamber 3 on its upper panel is used for reading said code—i.e., the scanner 8 is configured to read both a bar and a QR code 15, whichever is applied on the food package 14.

An input voltage control unit 11 and a data transfer unit 12 for providing data about a food product fully cooked are also connected to the controller 10 of the microwave oven 1 to transmit information to the server 13.

The input voltage control unit 11 monitors the supply line input voltage and transmits its values to the controller 10 in order to adjust programmed time stages with reference to the food cooking phases, thus controlling the microwave oven 1 for a high quality preparation of a food product according to a program that is encrypted into the bar or QR code 15 that is read by the scanner 8, since the main voltage is not always the standard 220V, but may fluctuate up or down.

The data transfer unit 12, after receiving information from the controller 10 confirming termination of the food cooking cycle, transmits the information about the cooked product to the server 13 in order to automatically keep records of certain food products available and usable inside catering refrigerators.

The operation of the microwave oven 1 by reading, via a scanner 8, a bar or QR code 15 attached to a food product package 14 located inside the cooking chamber 3 is carried out as follows.

A user turns on the microwave oven 1 by pressing the "on-off" button 5. Then, using the mode selection button 6, the user selects the automatic food cooking mode according to a bar or QR code 15 applied on the food package 14, which is displayed on the mode display screen 7. The user then opens the door 2 and inserts the package 14 into the cooking chamber 3 in such a way as to make the beams 17 of the laser emitters 9 (actuated by selecting "automatic food cooking mode") match the target marks 16 applied on the package 14 containing a food product in order to provide a fixed position of the bar or QR code 15 applied on the package 14 to facility the reading of the bar or QR code 15 by the scanner 8, as well as to provide an optimal space for accommodation of the food product package 14 inside the cooking chamber 3 for cooking.

Further, a user closes the door 2. Upon closing the door 2, a bar or QR code 15 is automatically read from the food package 14. When the bar or QR code 15 is regularly read by the reading scanner 8, the controller 10 of the microwave oven 1 disables the scanner 8 and laser emitters 9, after which the controller 10 actuates the cooling mode encrypted in the read bar or QR code 15. After the cooking cycle is finalized, the user then can open the door 2 of the microwave oven 1 and take out the cooked food product.

Consequently, operating the microwave 1 described herein oven provides for cooking a high quality food product by way of automatically reading a bar or QR code applied on the food product package using a scanner located inside the cooking chamber, which bar or QR code provides encrypted information that identifies the food product and the program for cooking the food product.

The invention claimed is:

1. A microwave oven comprising:
a cooking chamber for cooking food products;
a working panel placed on a face surface of the microwave oven;
a scanner configured to scan a bar or QR code from a package containing a food product and placed into the cooking chamber, the scanner being positioned on an upper panel of the cooking chamber; and
a controller configured to control a cooking operation of the food product based on data obtained in response to the scanner scanning the bar or QR code on the package containing the food product and located in the cooking chamber;
laser emitters located on the upper panel of the cooking chamber; and
an input voltage control unit;
wherein, when the package containing the food product is placed into the cooking chamber, the laser emitters match target marks located on the package to provide a fixed position of the bar or QR code on the package to enable the scanner to scan the bar or QR code; and
wherein the scanner, the laser emitters, and the input voltage control unit are connected to the controller to control the cooking operation of the food product.

2. The microwave oven of claim 1, wherein the laser emitters are installed on the upper panel of the cooking chamber symmetrically on opposite sides of the scanner.

3. The microwave oven of claim 1, wherein, in response to detecting a non-standard main line voltage, the input voltage control unit is configured to adjust programmed cooking time intervals with respect to food cooking phases encrypted into the bar or QR code.

4. The microwave oven of claim 1, further comprising a cooked product data transfer unit connected to the controller, the cooked product data transfer unit configured to transmit data about cooked food products to a server for storage.

* * * * *